United States Patent Office 3,368,666
Patented Feb. 13, 1968

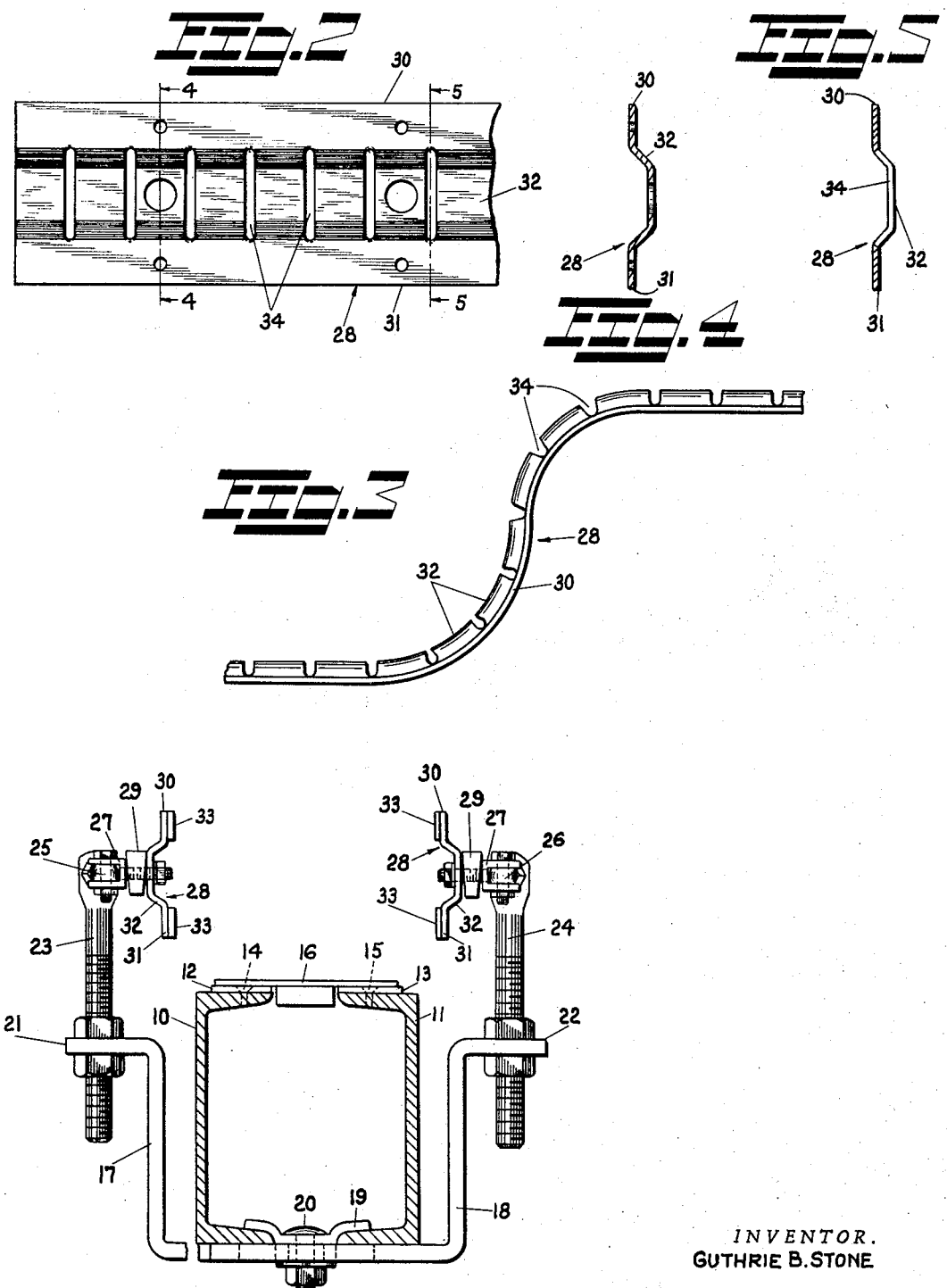
Feb. 13, 1968 — G. B. STONE — 3,368,666
CONVEYOR GUIDE RAIL
Filed Dec. 14, 1966
INVENTOR.
GUTHRIE B. STONE
ATTORNEY

3,368,666
CONVEYOR GUIDE RAIL
Guthrie B. Stone, Honeoye, N.Y., assignor to Stone Conveyor Company, Inc., Honeoye, N.Y., a corporation of New York
Filed Dec. 14, 1966, Ser. No. 601,653
1 Claim. (Cl. 198—204)

ABSTRACT OF THE DISCLOSURE

A guide rail for article handling conveyors having transverse slots spaced along its length facilitating selective hand forming of said rail at any point or points along the longitudinal extent thereof to accommodate a change in direction of movement of the articles being carried by said conveyor.

Background of the invention

The invention relates to article handling conveyors of the type which utilize guiding elements disposed in close proximity with the sides thereof to prevent lateral movement of the articles as they are moved along by said conveyor.

When moving articles along the length of the conveyor, it is often necessary to divert or change the direction of travel of said articles for numerous reasons such as space limitations and for diverting certain articles to receive a particular operation required in the production thereof.

The changing of a conveyor having curved guide rails to divert the articles conveyed thereby into different pathways and directions of travel presents undesirable changeover conditions which are considered quite expensive as well as uneconomical due to the excessive amount of conveyor down-time required to make a change-over of this sort.

Curved guide rails are very often custom fitted and are usually formed in a die or a set of specially contoured rolls. Flexible bands have been tried, but they do not possess the necessary rigidity of many forms of articles processed by conveying methods.

The guide rail according to the instant invention is easily formed and curved without the aid of special tools to conform to any desired configuration and possesses sufficient rigidity to prevent any possible lateral movement of the articles being conveyed relative to the direction of movement of the conveying member itself. U.S. Patent 3,280,962 discloses one form of conveyor to which the guide rail according to the invention is applicable, and it should be understood that the inventive concept may be utilized with various forms of article conveyors.

Summary of the invention

The guide rail of the present invention is adjustably supported in close proximity with the conveyor member as shown and described in the aforementioned patent and includes a pair of aligned and longitudinally extending guide flanges disposed in spaced relation which are interconnected by an integrally formed, dished web intermediate said flanges. The rail includes a series of transverse slots which are formed in the dished web portion and are disposed in spaced relation along the longitudinal extent of said rail. By simply applying pressure to one side or the other of the rail, it can be curved and bent to any desired configuration to meet the needs of a particular conveying arrangement.

Brief description of the drawing

FIG. 1 is an end view and partially in section of a conveying mechanism showing the guide rails according to the invention applied thereto;

FIG. 2 is a view in side elevation of the conveyor guide rail showing the series of transverse slots provided in the dished web portion thereof;

FIG. 3 is a top view of the guide rail in FIG. 2 showing one configuration to which said rail may be formed;

FIG. 4 is a sectional view taken along line 4—4 of FIG. 2; and

FIG. 5 is a view similar to that of FIG. 4 but taken along line 5—5 of FIG. 2.

Description of the preferred embodiment

Now referring to the figures of drawing enough of an article handling conveyor is shown in FIG. 1 to serve as a basis for a detailed description of the invention applied thereto.

In FIG. 1 there is shown a conveyor bed comprising opposed channel members 10 and 11 having wear resistant strip members 12 and 13 attached to the upper surfaces thereof by means of countersunk screws 14 and 15, respectively.

A conveyor member or chain of the table top type and which is identified by numeral 16 in FIG. 1 is movable longitudinally in a known manner over the top of the conveyor bed and in contact with the wear resistant strip members 12 and 13.

Angularly formed bracket members 17 and 18 are attached to the lower side of the conveyor bed by means of bolt anchors 19 and bolts 20 (one only of each shown in FIG. 1). These bracket members are disposed at spaced points along the length of the conveyor bed and extending upwardly adjacent the sides of the latter they terminate in flat, laterally extending surfaces 21 and 22, respectively.

Surfaces 21 and 22 serve as a means for mounting the adjustable guide rail support elements as shown and described in the aforementioned patent and which include vertically disposed eye bolts 23 and 24 that support horizontally disposed eye bolt 25 and 26, respectively. Each of the eye bolts 25 and 26 supports a clevis member 27 with the shank portion of the latter extending inwardly to support the conveyor guide rail according to the invention, which is generally indicated by numeral 28, in close proximity with the sides of the conveyor member 16. A selectively turnable cam member 29 is supported by the shank portion of the clevis immediately adjacent to the outer surface of the guide rail and serves as a means for tilting said guide rails on their vertical axes.

The guide rails include a pair of aligned and longitudinally extending guide flanges 30 and 31 which are disposed in spaced relation and are interconnected by an integrally formed dished web 32 intermediate said flanges.

As shown in FIG. 1, wear-resistant plastic strips 33, such as Delrin, Teflon, or nylon, are attached in any suitable manner to the guide flanges 30 and 31.

The dished web 32 is provided with a plurality of equally spaced transverse slots 34 which are disposed along the longitudinal extent of the guide rail 28 and serve as a means for manually forming the rail to meet the requirements of special and desired conveying arrangements.

To provide a curved guide rail of a particular or desired configuration one simply exerts pressure against one side or the other of the rail. As shown in FIG. 3 the transverse slots 32 form reliefs which will become wider or narrower depending on which direction the guide flanges 30 and 31 are directed while being formed. Additionally these transverse slots 32 may vary in width to facilitate forming a particular shape or bend which is necessary to permit the sum of the accumulated gathering to allow the average minimum radius desired to be formed.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claim.

I claim:

1. Opposed guide rails for an article handling conveyor having a bed and a conveyor member movable across said bed, adjustable support elements for positioning said guide rails in close proximity with articles carried by said conveyor member, said guide rails including a pair of aligned and longitudinally extending guide flanges disposed in spaced relation and interconnected by an integrally formed dished web disposed intermediate said flanges, said dished web being provided with a plurality of transverse slots equally disposed in spaced relation along the longitudinal extent thereof for facilitating selective alteration of the longitudinal configuration of said guide rails, whereby the latter are formable along the length thereof to accommodate a change in direction of movement of the articles being carried by said conveyor member.

References Cited

UNITED STATES PATENTS 2,597,345    5/1952    Lee _____ 198—204
3,280,962    10/1966    Stone _____ 198—204

EDWARD A. SROKA, *Primary Examiner.*